(12) United States Patent
Tang

(10) Patent No.: US 10,909,042 B1
(45) Date of Patent: Feb. 2, 2021

(54) PREVENTION OF HASH-BASED API IMPORTING

(71) Applicant: Cylance Inc., Irvine, CA (US)

(72) Inventor: Jeffrey Tang, Arlington, VA (US)

(73) Assignee: Cylance Inc., Irvine, CA (US)

(*) Notice: Subject to any disclaimer, the term of this patent is extended or adjusted under 35 U.S.C. 154(b) by 0 days.

(21) Appl. No.: 16/516,827

(22) Filed: Jul. 19, 2019

(51) Int. Cl.
*G06F 12/00* (2006.01)
*G06F 12/1018* (2016.01)
*G06F 9/50* (2006.01)
*G06F 9/30* (2018.01)
*G06F 9/54* (2006.01)

(52) U.S. Cl.
CPC ...... *G06F 12/1018* (2013.01); *G06F 9/30036* (2013.01); *G06F 9/30072* (2013.01); *G06F 9/5016* (2013.01); *G06F 9/541* (2013.01)

(58) Field of Classification Search
CPC ............. G06F 12/1018; G06F 9/30036; G06F 9/30072; G06F 9/5016; G06F 9/541
See application file for complete search history.

(56) References Cited

U.S. PATENT DOCUMENTS

| | | | | |
|---|---|---|---|---|
| 5,088,026 A * | 2/1992 | Bozman | ............. | G06F 12/1063 711/112 |
| 5,463,724 A * | 10/1995 | Anderson | ............. | G06F 40/117 715/209 |
| 6,253,258 B1 * | 6/2001 | Cohen | ................. | G06F 8/54 719/331 |
| 9,390,261 B2 * | 7/2016 | Costa | ................. | G06F 21/52 |
| 9,904,792 B1 * | 2/2018 | Badishi | ................. | G06F 21/62 |
| 10,650,141 B2 * | 5/2020 | Loman | ................. | G06F 21/54 |
| 2008/0046738 A1 * | 2/2008 | Galloway | ............ | H04L 63/1416 713/176 |
| 2011/0219208 A1 * | 9/2011 | Asaad | ................. | G06F 9/06 712/12 |
| 2019/0146803 A1 * | 5/2019 | Reed | ................. | G06F 9/4856 703/2 |
| 2019/0247718 A1 * | 8/2019 | Blevins | ............. | A63B 24/0075 |

* cited by examiner

*Primary Examiner* — Mano Padmanabhan
*Assistant Examiner* — Mohammad S Hasan
(74) *Attorney, Agent, or Firm* — Jones Day

(57) ABSTRACT

Hash-based application programming interface (API) importing can be prevented by allocating a name page and a guard page in memory. The name page and the guard page being associated with (i) an address of names array, (ii) an address of name ordinal array, and (iii) an address of functions array that are all generated by an operating system upon initiation of an application. The name page can then be filled with valid non-zero characters. Thereafter, protections on the guard page can be changed to no access. An entry is inserted into the address of names array pointing to a relative virtual address corresponding to anywhere within the name page. Access to the guard page causes the requesting application to terminate. Related apparatus, systems, techniques and articles are also described.

20 Claims, 4 Drawing Sheets

PREVENTION OF HASH-BASED API IMPORTING

TECHNICAL FIELD

The subject matter described herein relates to techniques for preventing malicious software associated with resolving the location of operating system application programming interfaces (API).

BACKGROUND

Microsoft WINDOWS provides an application programming interface (API) in the form of dynamic link libraries (DLLs). These DLLs are specified by the Portable Executable (PE) file format which provides metadata for the various API functions. Programs rely on the various APIs provided by Microsoft WINDOWS in order to provide useful functionality for the user.

SUMMARY

Hash-based application programming interface (API) importing can be prevented by allocating a name page and a guard page in memory. The name page and the guard page being associated with (i) an address of names array, (ii) an address of name ordinal array, and (iii) an address of functions array that are all generated by an operating system upon initiation of an application. The name page can then be filled with valid non-zero characters. Thereafter, protections on the guard page can be changed to no access. An entry is inserted into the address of names array pointing to a relative virtual address corresponding to anywhere within the name page. Access to the guard page causes the requesting application to terminate. Related apparatus, systems, techniques and articles are also described.

The name page and the guard page can both initially be allocated with read write permissions.

The entry can be inserted into the address of names array is inserted at a beginning of the address of names array. Further, a new entry can be inserted at a beginning of the address of name ordinals array having any value.

The operating system can be, for example, MICROSOFT WINDOWS.

The name page and the guard page can be adjacent in the memory.

The filled name page can be arranged so as to not include a null terminator.

During runtime, a hash algorithm (or other algorithm) can traverse the address of names array until a pointer to the name page is selected. The hash algorithm can then first access the name page. Due to the name page being filled with values, the hash algorithm subsequently accesses the guard page after determining that the name page does not include a NULL byte signifying end of a string encapsulated therein.

A memory access violation can be raised when the guard page is accessed. A vectored exception handler can catch such a memory access violation and cause the program to terminate as opposed to crashing. The vectored exception handler can also be configured to ignore exceptions other than the memory access violation causing the program to crash.

In an interrelated aspect, a hash algorithm associated with a program traverses an address of names array until a pointer to a name page is selected. Thereafter, the hash algorithm initially access the name page. The hash algorithm subsequently access a corresponding guard page after determining that the name page does not include a NULL byte signifying end of a string encapsulated therein. The program is caused to terminate upon access of the guard page.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter helps thwart malicious actors from executing software which relies on hash-based importing of APIs.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to preventing malicious software associated with resolving the location of operating system APIs. In particular, the current subject matter is directed to preventing hash-based API importing. Imports, in this context, are functions that are called from other files (such as DLL files with the WINDOWS operating system).

With WINDOWS, a compiler toolchain and a WINDOWS loader runtime work together to connect a program to the appropriate API calls as specified by the developer. These connections can be resolved at program start time via the WINDOWS loader parsing the program's import table or resolved dynamically at runtime via calls (e.g., calls to LoadLibrary and GetProcAddress both of which are APIs that and must be resolved at program start time).

As an example, a program that wants to allocate dynamic memory (heap) must call the VirtualAlloc API provided by kernel32.dll. In a traditional program, the program contains an import table entry for VirtualAlloc which will be filled in with the correct address when the process initializes and the code merely references the offset of the import table in memory when calling the API. The alternative is to call GetProcAddress (hKernel32, "VirtualAlloc") at runtime to get the address and subsequently call it as normal (in this case, GetProcAddress was initialized in the import table by the process loader).

The process for resolving APIs in both the import table method (process loader) and dynamic resolution method (GetProcAddress) rely on common code implemented in LdrGetProcedureAddress to identify the correct export and find the corresponding address. For a requested API function (e.g. NtLockVirtualMemory), the code walks down the AddressOfNames array (which contains relative virtual addresses to API names) and compares the string to the requested API function name. The string comparison (strcmp) (as provided below) compares the function name a single character at a time until it reaches the end of string. If any character differs along the way, the function terminates immediately instead of continuing the comparison on the rest of the string (which would be a waste of computation cycles/processing resources, etc.).

One example strcmp implementation is as follows:
```
int strcmp (char* s1, char* s2)
{
   for (; *s1==*s2, ++s1, ++s2)
     if (*s1==0)
       return 0;
   return *s1>*s2? -1:1;
}
```

Figure 1:
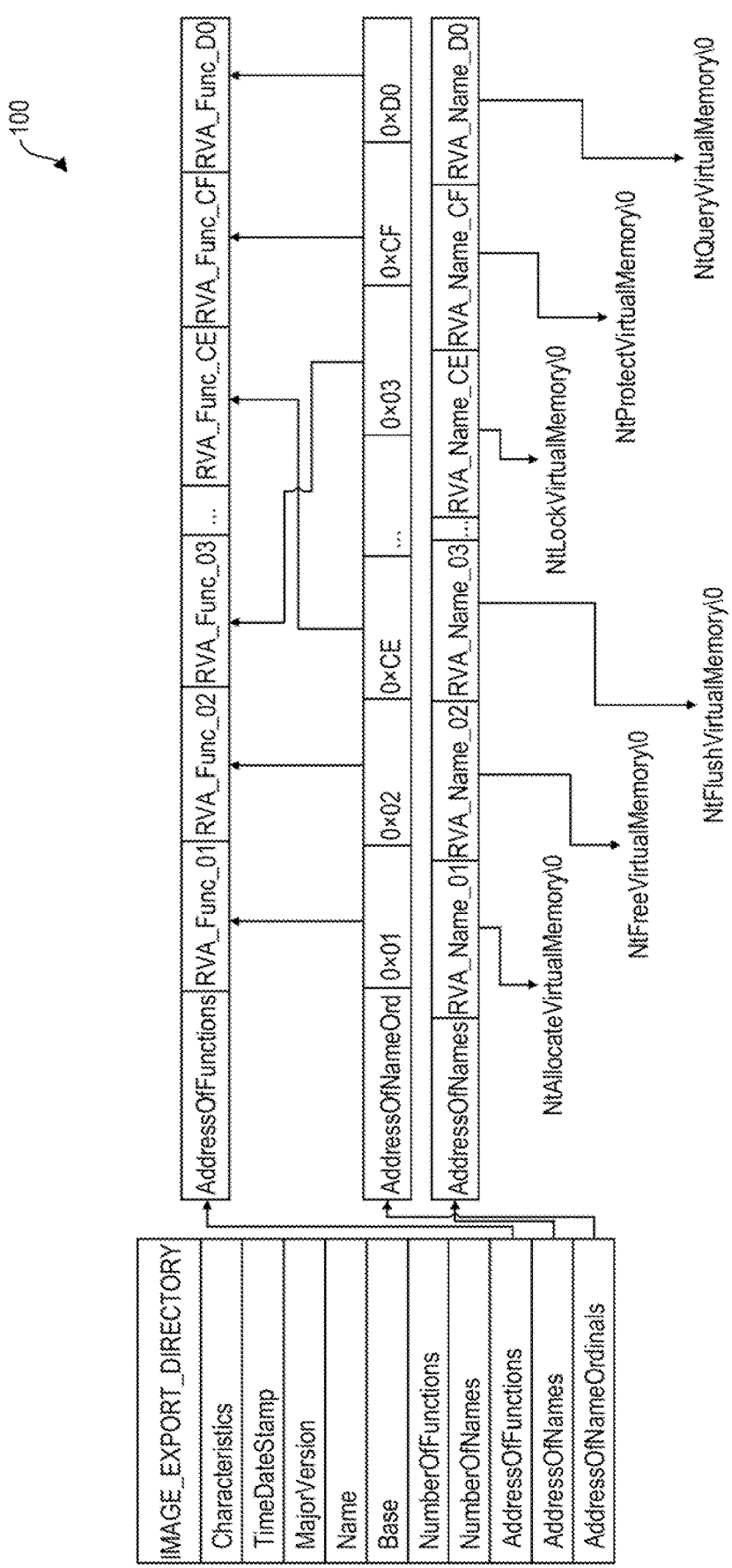
FIG. 1 is a first diagram illustrating arrays for identifying locations of API functions.

If strcmp indicates the string is a match, the corresponding offset in the AddressOfNameOrdinal array is referenced to get the corresponding index into the AddressOfFunctions array. In diagram 100 of FIG. 1, NtLockVirtualMemory is in index 0xCE of the AddressOfNames and AddressOfNameOrdinals array; the value stored in the AddressOfNameOrdinals entry is 0x03 indicating the relative virtual address (RVA) of NtLockVirtualMemory is in the 3rd entry of the AddressOfFunctions array. This RVA is added to the base address of the module to get the absolute address of the function.

Exploit payloads (shellcode) do not have an import table and malicious executables avoid import table entries in an attempt to obfuscate their behavior and evade static analysis. Instead, malicious executables must manually re-implement the same behavior: GetModuleHandle is re-implemented by parsing the Process Environment Block (PEB) and dereferencing the structure PEB.Ldr.InMemoryOrderModuleList to get the first loaded module (and walk the doubly-linked list by following the Flink pointer to get the next module); with the address of the module, the payload can re-implement GetProcAddress by manually parsing the module's IMAGE_EXPORT_DIRECTORY to find the appropriate API name.

A common optimization is to replace the string comparison procedure with a hash comparison to reduce the number of required bytes in the shellcode. For example, NtAllocateVirtualMemory\0 requires 24 bytes but a 32-bit hash, 0x55ee99de corresponding to same function only requires 4 bytes. This optimization has a side benefit of removing strings out of the payload which makes static analysis slightly more difficult.

Such hashes can be computed via hashing algorithms that are fairly simplistic; however, there are numerous hash algorithms. Malicious actors will change hash algorithms or mutate existing ones to generate different hash values to avoid detection by known hash values.

With the current subject matter, specially crafted DLL files can be loaded into certain or all processes to generate hash collisions for the hash algorithm. As an example, CyNTFMIHYBLXA.dll can cause a hash collision with ntdll.dll and CyKNPHDOJQHQZ.dll can cause a hash collision with kernel32.dll. Within these DLL files are a number of exports such as VCNYXPFBZQ which can cause a hash collision with NtAllocateVirtualMemory. These two DLLs allow for the catching of any exploit payloads or malicious programs which rely on the specific hash algorithm as provided below.

```
unsigned int hash(char* s1)
{
   unsigned int h=0;
   do
   {
     h=_rotr(h, 13)
     h+=*c;
   } while (*++c);
   return h;
}
```

Such an approach is effective at stopping Metasploit's meterpreter payload and any other tool which relies on Stephen Fewer's Reflective DLL Injection technique but misses other payloads which use different hashing algorithms. The current subject matter provides protection against other hash algorithms.

There is a subtle difference in how the memory (where the function name is stored) is accessed between the standard strcmp and hash algorithms. The strcmp algorithm terminates when it encounters the first character where the strings do not match while the hash algorithm must generate the hash of the entire string before it can compare it to the desired hash value. The current subject matter exploits this behavior by manipulating the module's export table in memory and installing a specially crafted export table entry which causes strcmp to terminate correctly but forces the hash algorithm into an exception condition by reading invalid memory.

Figure 2:
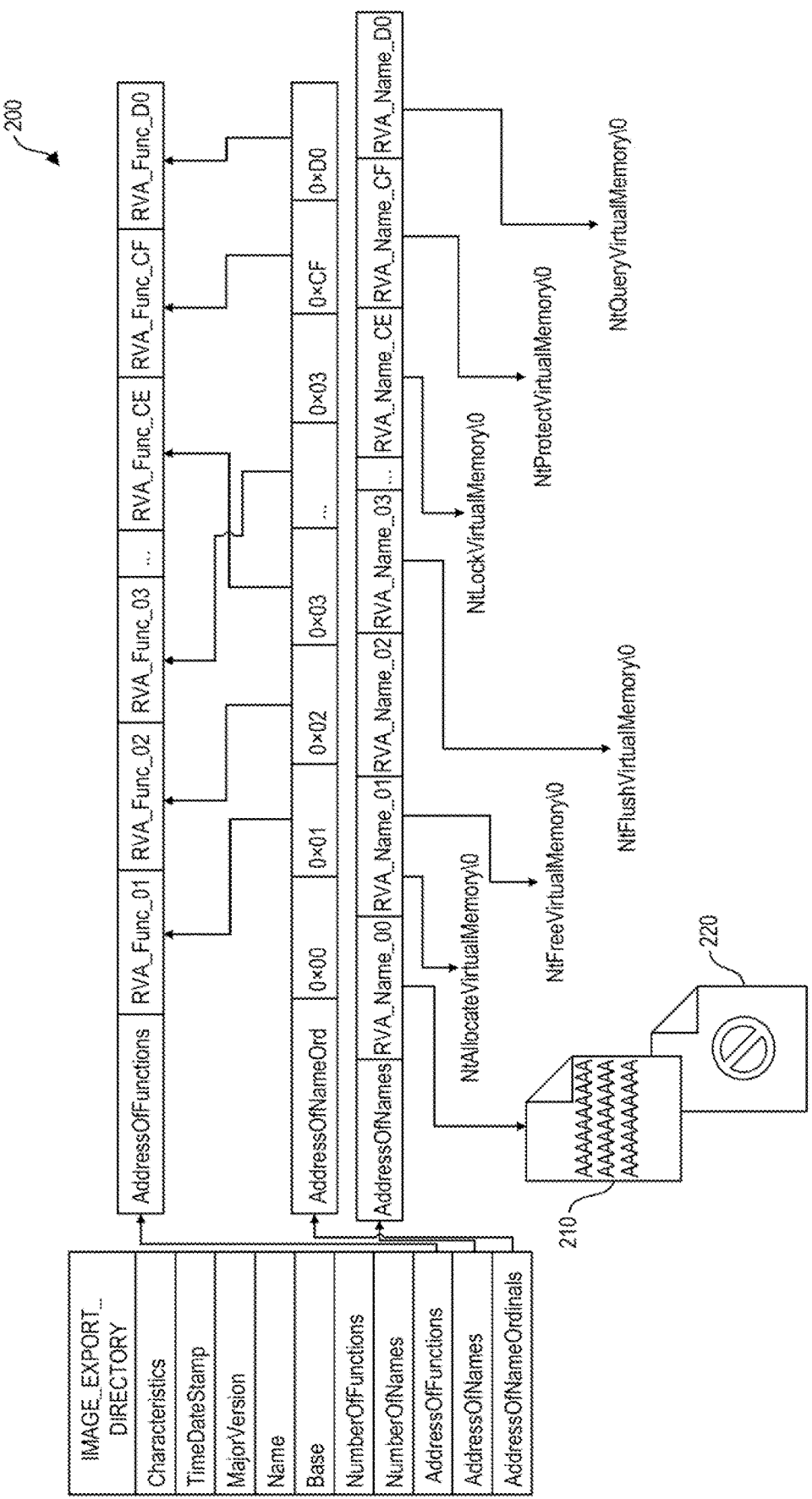
FIG. 2 is a second diagram illustrating arrays for identifying locations of API functions.

The trap as provided herein can include the following steps:

1. Allocate two adjacent memory pages with PAGE_READWRITE permissions (pages 210, 220 in diagram 200 of FIG. 2).

2. Fill a first page 210 with any non-zero value, e.g. AAAAAAAAAA (4096 A's) and do NOT include a NULL terminator, creating a "name page".

3. Change the protections on the second page 220 to PAGE_NOACCESS, creating a "guard page" (represented with a "No Access" symbol in FIG. 2).

4. Insert a new entry at the beginning of the AddressOfNames array with the relative virtual address to the name page 210.

5. Insert a new entry at the beginning of the AddressOfNameOrdinals array and give it any value.

Under normal operation, strcmp will compare the requested API name against the values in the name page 210 AAAAAAA . . . AAAAA and terminate before reading the guard page 220 because there is no valid API name which consists of 4096 A's. When the hash function attempts to calculate the hash value of the name, it reads the 4097th byte which is in the guard page 220, causing the operating system to raise a memory access violation. The memory access violation can be caught, for example, with Vectored Exception Handling (VEH) and, in some cases, the corresponding program can be affirmatively terminated as opposed to being allowed to crash.

The current approach extends generically to all hashing algorithms because it exploits how hash calculations are performed: they run until it finds a NULL byte (a byte with the value of 0) signifying the end of the string.

When being implemented, one detail to consider is the fact that relative virtual addresses (RVAs) can only be positive deltas because they are unsigned integers. Therefore, the name page 210 and the guard page 220 need to be allocated in a memory address higher than the module address.

The VEH can take an additional step to compare the faulting read address with the address of the guard page 220 and ignore all other exceptions (which should just cause a program crash).

Hash-based application programming interface (API) importing can be prevented by allocating a name page and a guard page in memory. The name page and the guard page being associated with (i) an address of names array, (ii) an address of name ordinal array, and (iii) an address of functions array that are all generated by an operating system upon initiation of an application. The name page can then be filled with valid non-zero characters. Thereafter, protections on the guard page can be changed to no access. An entry is into the address of names array pointing to a relative virtual address corresponding to anywhere within the name page. Access to the guard page causes the requesting application to terminate. Related apparatus, systems, techniques and articles are also described.

Figure 3:
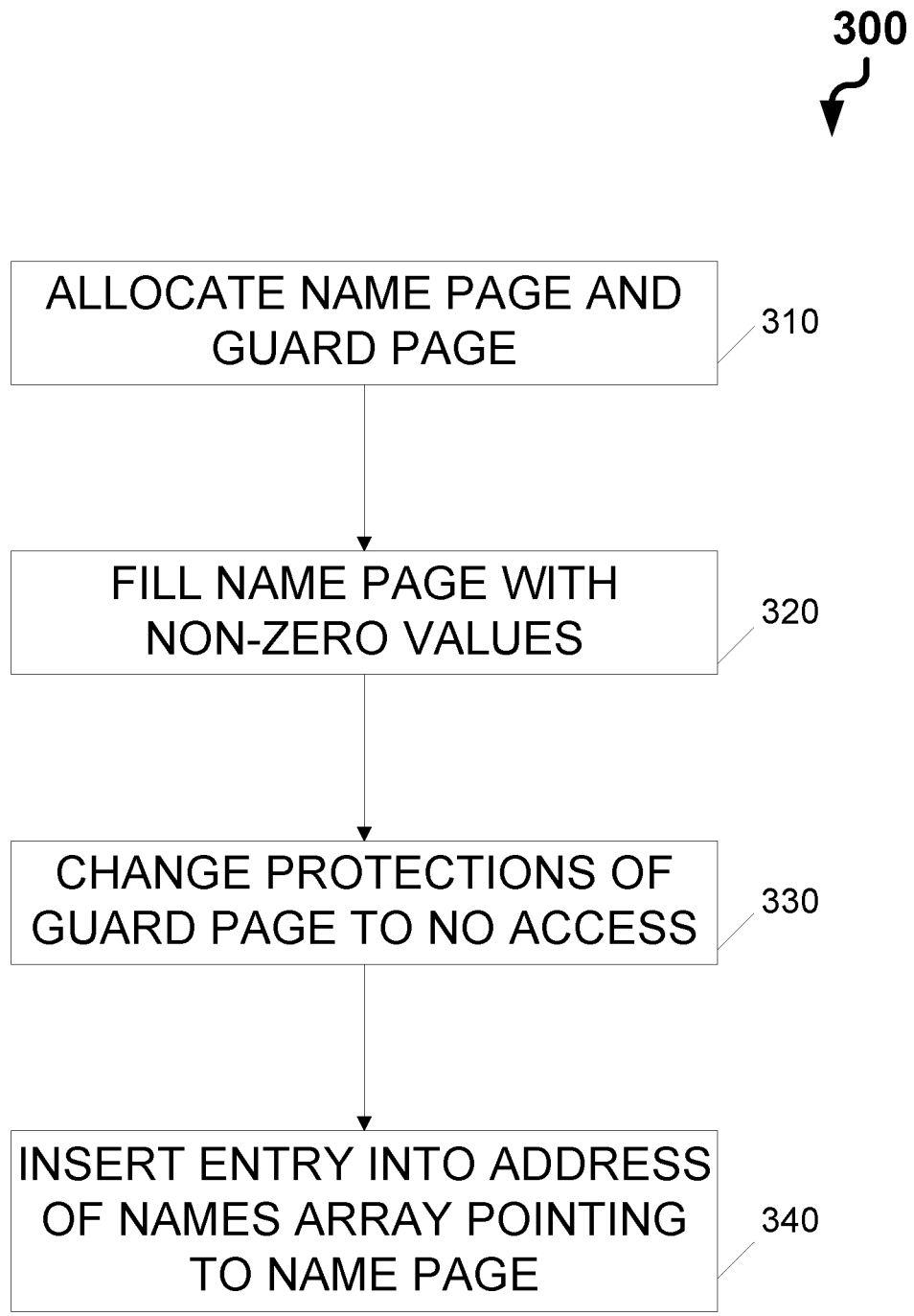
FIG. 3 is a process flow diagram illustrating preventing of hash-based application programming interface (API) import exploits.

FIG. 3 is a diagram 300 illustrating for prevention of hash-based application programming interface (API) importing by allocating, at 310, a name page and a guard page in memory. The name page and the guard page being associated with (i) an address of names array, (ii) an address of name ordinal array, and (iii) an address of functions array that are all generated by an operating system upon initiation of an application. The name page can then be filled, at 320, with valid non-zero characters. Thereafter, at 330, protections on the guard page can be changed to no access. An entry is inserted, at 340, into the address of names array pointing to a relative virtual address corresponding to anywhere within the name page. Access to the guard page causes the requesting application to terminate.

Figure 4:
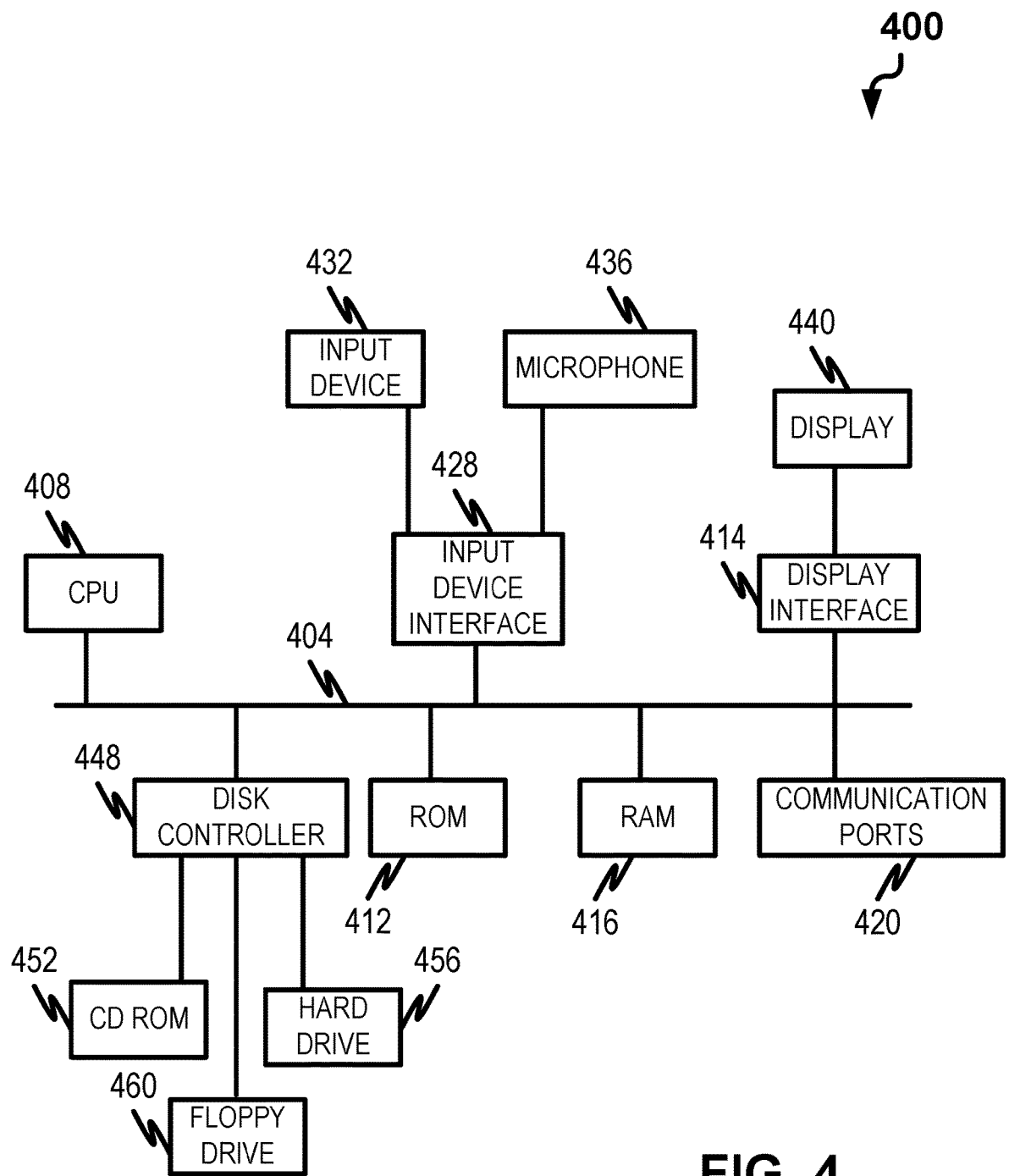
FIG. 4 is a diagram illustrating components of a computing device for implementing aspects of the current subject matter.

FIG. 4 is a diagram 400 illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface with one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the at least one communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 via a display interface 414 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. The input device 432 and the microphone 436 can be coupled to and convey information via the bus 404 by way of an input device interface 428. Other computing devices, such as dedicated servers, can omit one or more of the display 440 and display interface 414, the input device 432, the microphone 436, and input device interface 428.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for preventing a hash-based application programming interface (API) importing comprising:
   allocating a name page and a guard page in memory, the name page and the guard page being associated with (i) an address of names array, (ii) an address of name ordinal array, and (iii) an address of functions array that are all generated by an operating system upon initiation of an application;
   filling the name page with valid non-zero characters;
   changing protections on the guard page to no access; and
   inserting an entry into the address of names array pointing to a relative virtual address corresponding to anywhere within the name page.

2. The method of claim 1, wherein the name page and the guard page are both initially allocated with read write permissions.

3. The method of claim 1, wherein the entry inserted into the address of names array is inserted at a beginning of the address of names array.

4. The method of claim 3 further comprising:
   inserting a new entry at a beginning of the address of name ordinals array having any value.

5. The method of claim 1, wherein the operating system is MICROSOFT WINDOWS.

6. The method of claim 1, wherein the name page and the guard page are adjacent in the memory.

7. The method of claim 1, wherein the filled name page does not include a null terminator.

8. The method of claim 1 further comprising:
   traversing, by a hash algorithm, the address of names array until a pointer to the name page is selected;
   initially accessing, by the hash algorithm, the name page;
   subsequently accessing, by the hash algorithm, the guard page after determining that the name page does not include a NULL byte signifying end of a string encapsulated therein.

9. The method of claim 1 further comprising:
   raising a memory access violation when the guard page is accessed.

10. The method of claim 9 further comprising:
    catching, by a vectored exception handler, the memory access violation; and
    causing the program to affirmatively terminate rather than crash.

11. The method of claim 10 further comprising:
    ignoring, by the vectored exception handler, exceptions other than the memory access violation causing the program to crash.

12. A system for preventing a hash-based application programming interface (API) importing, the system comprising:
    at least one data processor; and
    memory storing instructions which, when executed by the at least one data processor, result in operations comprising:
      allocating a name page and a guard page in memory, the name page and the guard page being associated with (i) an address of names array, (ii) an address of name ordinal array, and (iii) an address of functions array that are all generated by an operating system upon initiation of an application;
      filling the name page with valid non-zero characters;
      changing protections on the guard page to no access; and
      inserting an entry into the address of names array pointing to a relative virtual address corresponding to anywhere within the name page.

13. The system of claim 12, wherein the name page and the guard page are both initially allocated with read write permissions.

14. The system of claim 12, wherein the entry inserted into the address of names array is inserted at a beginning of the address of names array; and wherein the operations further comprise:
    inserting a new entry at a beginning of the address of name ordinals array having any value.

15. The system of claim 12, wherein the operating system is MICROSOFT WINDOWS.

16. The system of claim 12, wherein the name page and the guard page are adjacent in the memory.

17. The system of claim 12, wherein the filled name page does not include a null terminator.

18. The system of claim 12, wherein the operations further comprise:
    traversing, by a hash algorithm, the address of names array until a pointer to the name page is selected;
    initially accessing, by the hash algorithm, the name page;
    subsequently accessing, by the hash algorithm, the guard page after determining that the name page does not include a NULL byte signifying end of a string encapsulated therein.

19. The system of claim 12, wherein the operations further comprise:
    raising a memory access violation when the guard page is accessed;
    catching, by a vectored exception handler, the memory access violation;
    causing the program to affirmatively terminate rather than crash; and
    ignoring, by the vectored exception handler, exceptions other than the memory access violation causing the program to crash.

20. A method comprising:
    traversing, by a hash algorithm associated with a program, an address of names array until a pointer to a name page is selected;
    initially accessing, by the hash algorithm, the name page;
    subsequently accessing, by the hash algorithm, a corresponding guard page after determining that the name page does not include a NULL byte signifying end of a string encapsulated therein;
    causing the program to terminate upon access of the guard page.

* * * * *